(12) United States Patent
Leonhardt et al.

(10) Patent No.: US 11,912,387 B2
(45) Date of Patent: Feb. 27, 2024

(54) SUBMERSIBLE REMOTE OPERATED VEHICLE TOOL CHANGE CONTROL

(71) Applicant: FMC Technologies, Inc., Houston, TX (US)

(72) Inventors: Mark Leonhardt, Sacramento, CA (US); Bijou Abraham, Sacramento, CA (US); Peter Boissiere, Los Ranchos, NM (US); Steve Cohan, Davis, CA (US); Kevin Hjelden, Sacramento, CA (US); Doug Mayne, Vacaville, CA (US); Tim Ranstrom, Davis, CA (US); Sean Rogers, Sacramento, CA (US); Kevin Schell, Davis, CA (US); Spencer Slam, Sacramento, CA (US); Adwait Jayant Gandhe, Mountain View, CA (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 18/185,947

(22) Filed: Mar. 17, 2023

(65) Prior Publication Data

US 2023/0249791 A1 Aug. 10, 2023

Related U.S. Application Data

(63) Continuation of application No. 16/460,467, filed on Jul. 2, 2019, now Pat. No. 11,608,148.

(Continued)

(51) Int. Cl.
*G06F 17/00* (2019.01)
*B25J 9/16* (2006.01)
(Continued)

(52) U.S. Cl.
CPC ............ *B63G 8/001* (2013.01); *B25J 9/1633* (2013.01); *B25J 9/1664* (2013.01); *B25J 13/085* (2013.01);
(Continued)

(58) Field of Classification Search
CPC ............ B63G 8/001; B63G 2008/002; B63G 2008/005; B63G 2008/007; B25J 9/1633;
(Continued)

(56) References Cited

U.S. PATENT DOCUMENTS 3,381,485 A * 5/1968 Crooks ................... B25J 19/023
414/626
5,523,543 A 6/1996 Hunter et al.
(Continued)

FOREIGN PATENT DOCUMENTS

| CN | 102561979 | 7/2012 |
|---|---|---|
| CN | 107072730 | 8/2017 |

(Continued)

OTHER PUBLICATIONS

Modelling-design-and-robust-control-of-a-remotely-operated-underwater-vehicle (Year: 2014).*

(Continued)

*Primary Examiner* — Ronnie M Mancho
(74) *Attorney, Agent, or Firm* — Fish & Richardson P.C.

(57) ABSTRACT

A system receives data from a submersible remote operated vehicle (ROV), the data being about the operation of an arm of the ROV. The system automatically controls, based on the data, movement of the arm in docking the arm to a tool holder. In certain instances, the system implements an image based control. In certain instances, the system implements a force accommodation control. In certain instances, the system implements both.

20 Claims, 6 Drawing Sheets

Related U.S. Application Data

(60) Provisional application No. 62/830,104, filed on Apr. 5, 2019.

(51) Int. Cl.
  *B25J 13/08* (2006.01)
  *B25J 15/04* (2006.01)
  *B63G 8/00* (2006.01)
  *B63C 11/52* (2006.01)

(52) U.S. Cl.
  CPC .......... *B25J 15/0491* (2013.01); *B63C 11/52* (2013.01); *B63G 2008/002* (2013.01); *B63G 2008/005* (2013.01); *G05B 2219/40271* (2013.01)

(58) Field of Classification Search
  CPC .... B25J 9/1664; B25J 13/085; B25J 15/0491; B25J 9/1689; B63C 11/52; G05B 2219/40271; G05B 2219/40184; E21B 41/04
  USPC ............................................................. 701/1
  See application file for complete search history.

(56) References Cited

U.S. PATENT DOCUMENTS

| | | | |
|---|---|---|---|
| 8,900,106 B2 | 12/2014 | McCoy, Jr. | |
| 9,840,886 B1 | 12/2017 | Gable et al. | |
| 10,442,025 B2 | 10/2019 | Jones et al. | |
| 10,751,872 B2 * | 8/2020 | Pettersen | B25J 9/065 |
| 10,813,704 B2 | 10/2020 | Kostrzewski et al. | |
| 10,813,710 B2 * | 10/2020 | Grubbs | G09B 23/285 |
| 11,135,022 B2 | 10/2021 | Crawford et al. | |
| 11,235,890 B1 * | 2/2022 | Dahlstrom | B05C 11/1005 |
| 11,608,148 B2 | 3/2023 | Leonhardt et al. | |
| 2002/0040783 A1 * | 4/2002 | Zimmerman | E21B 47/001 |
| | | | 166/360 |
| 2009/0233774 A1 | 9/2009 | McCoy, Jr. | |
| 2011/0043515 A1 * | 2/2011 | Stathis | G01C 15/002 |
| | | | 434/118 |
| 2012/0298706 A1 * | 11/2012 | Gordon | B25J 15/0491 |
| | | | 224/401 |
| 2013/0014688 A1 * | 1/2013 | Yemington | B66C 13/02 |
| | | | 114/264 |
| 2013/0259577 A1 | 10/2013 | Hansen et al. | |
| 2014/0090506 A1 * | 4/2014 | Tobey | B25J 19/0029 |
| | | | 74/490.01 |
| 2014/0147217 A1 * | 5/2014 | Ammerlaan | E02B 17/04 |
| | | | 405/203 |
| 2015/0190925 A1 | 7/2015 | Hoffman et al. | |
| 2015/0224638 A1 | 8/2015 | Dockter | |
| 2015/0367510 A1 | 12/2015 | Naitou et al. | |
| 2016/0346930 A1 | 12/2016 | Hares | |
| 2017/0095937 A1 | 4/2017 | Williams et al. | |
| 2017/0217021 A1 | 8/2017 | Hoffman et al. | |
| 2017/0285202 A1 | 10/2017 | Fyffe et al. | |
| 2017/0370173 A1 * | 12/2017 | Gable | E21B 33/076 |
| 2018/0021945 A1 * | 1/2018 | Pettersen | B25J 9/065 |
| | | | 700/245 |
| 2018/0251199 A1 * | 9/2018 | Radford | B25J 11/00 |
| 2019/0111575 A1 | 4/2019 | Asano et al. | |
| 2020/0317311 A1 | 10/2020 | Correll et al. | |
| 2020/0317312 A1 | 10/2020 | Leonhardt et al. | |

FOREIGN PATENT DOCUMENTS

| | | |
|---|---|---|
| CN | 108462108 | 8/2018 |
| GB | 2365895 | 2/2002 |
| JP | H0631670 | 2/1994 |
| JP | 4439812 | 3/2010 |
| JP | 2017071033 | 4/2017 |
| JP | 2018126498 | 8/2018 |
| KR | 100986215 B1 | 10/2010 |
| KR | 20130000008 | 1/2013 |
| KR | 20130068430 | 6/2013 |
| NO | 326675 B1 | 2/2002 |
| WO | WO 2003/040602 | 5/2003 |
| WO | WO 2013/050051 | 4/2013 |
| WO | WO 2018/057344 | 3/2018 |
| WO | WO 2018/091574 | 5/2018 |
| WO | WO 2018/145917 | 8/2018 |

OTHER PUBLICATIONS

Modelling-design-and-robust-control-of-a-remotely-operated-underwater-vehicle (Year: 2014) (Year: 2014).*

Office Action in Chinese Appln. No. 202080027340.7, dated Nov. 7, 2023, 44 pages (with Machine translation).

Tiedong et al., "Submersible Design Principles," Harbin Engineering University Press, Jan. 2011, 228-229 (with Machine translation).

International Preliminary Report on Patentability in International Appln. No. PCT/US2020/026638, dated Oct. 14, 2021, 7 pages.

International Search Report and Written Opinion in International Application No. PCT/US2020/026,638, dated Jul. 23, 2020, 11 pages.

Office Action in Chinese Appln. No. 202080027340.7, dated Apr. 21, 2023, 43 pages (with English translation).

Office Action in European Appln. No. 20723625.8, dated Nov. 29, 2022, 52 pages.

* cited by examiner

SUBMERSIBLE REMOTE OPERATED VEHICLE TOOL CHANGE CONTROL

CROSS-REFERENCE TO RELATED PATENT APPLICATIONS

This application is a continuation of and claims the benefit of priority to U.S. patent application Ser. No. 16/460,467, filed Jul. 2, 2019, which claims the benefit of priority to U.S. Provisional Patent Application No. 62/830,104, filed Apr. 5, 2019, the contents of which are incorporated by reference herein.

BACKGROUND

In petrochemical exploration and production, many offshore wells are at depths well beyond the reach of divers. In these instances, a submersible remote operated vehicle (ROV) is controlled from above the water's surface to perform some operations in the construction and control of the wells. The ROV has a manipulator arm that can mount tools for use in performing these operations. Some manipulator arms have the capability to remotely release from and attach to tools, so that different tools can be interchanged while the ROV is subsea.

BRIEF DESCRIPTION OF THE DRAWINGS

Throughout the figures, like reference numbers are used to indicate the like parts.

DETAILED DESCRIPTION

Figure 1:
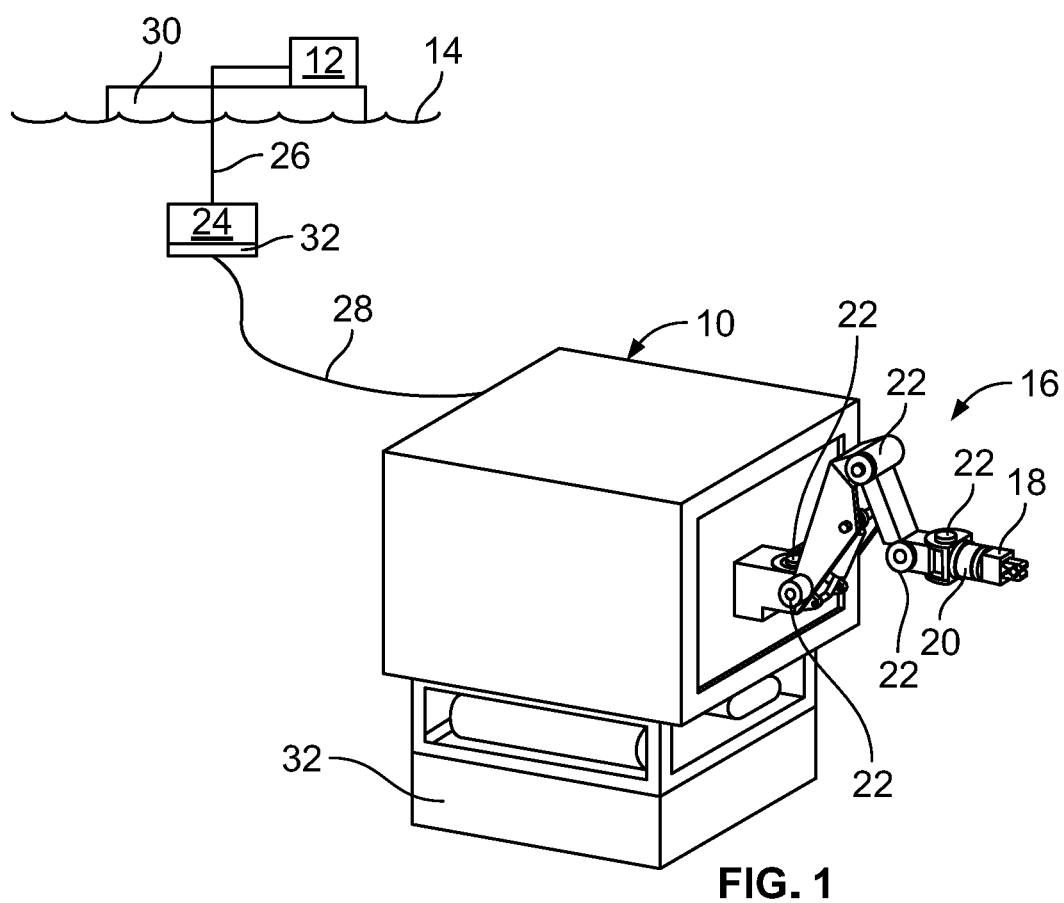
FIG. 1 is a perspective view of a submersible remote operated vehicle (ROV) operating subsea.

FIG. 1 shows an example submersible remote operated vehicle (ROV) 10 operating subsea. The ROV 10 can be controlled by a human operator from a control interface 12, typically on a vessel 30 (e.g., a platform, ship or other vessel) above a surface 14 of a body of water, to fly through the water and perform certain operations. The ROV 10 of FIG. 1 includes a manipulator arm 16 with a tool 18 attached to its end. In certain instances, the ROV 10 can include one or more additional arms, such as a grabber or other type of arm, but the manipulator arm 16 is the most dexterous, having multiple pivot and rotational joints 22 that enable movement of the arm in multiple degrees of freedom. In certain instances, the joints 22 in the manipulator arm 16 collectively provide 6 degrees of freedom (i.e., movement along the X-axis, Y-axis, Z-axis, roll, pitch, and yaw). Each joint 22 includes a mechanical joint that enables movement between the connected segments of the arm 16, one or more actuators to drive movement of the joint and, in certain instances, one or more sensors, such as position and force (linear and/or torque) sensors.

The control interface 12 is communicably coupled to the ROV 10 submerged in the water. In some cases, the ROV 10 is connected to the control interface 12 through a tether management system (TMS) 24, also submerged in the water, and supported from the vessel 30. The operator controls the ROV 10 to fly around and perform operations and the TMS 24, in performing those operations, via the control interface 12. An umbilical 26 extends between the control interface 12 at the vessel 30 to the TMS 24. The TMS 24 pays out and takes up a tether 28 that extends between the TMS 24 and the ROV 10. The umbilical 26 and tether 28 communicate power, e.g., electrical power, and data between the control interface 12 and the TMS 24 and ROV 10. The data communicated on the umbilical 26 and tether 28 includes control signals to actuators of the TMS 24 and ROV 10 and other control communications, output from sensors at the TMS 24 and ROV 10, and other data.

The ROV 10, in turn, supplies power, e.g., electrical and/or hydraulic power, and exchanges data with the tool 18 through the manipulator arm 16, enabling the operator to actuate and operate the tool 18 via the control interface 12. The tool 18 and ROV 10 communicate data including control signals to actuators in the tool 18, output from sensors in the tool 18, and other data, via the manipulator arm 16, which, in turn, can be communicated with the control interface 12.

FIG. 1 shows the tool 18 as a jaws with two parts that can be operated to open and close to grasp and hold objects. But, there are a multitude of different tools that can be used with an ROV, including torque tools, cutters and other tools. A tool interchange 20 mounts at the end of the manipulator arm 16, between the manipulator arm 16 and the tool 18, becoming the interface between the arm 16 and the tool 18. The tool interchange 20 enables the ROV 10 to change out tools 18 while subsea with no outside assistance. While there are many examples of tool interchange 20 that could be used herein, co-pending U.S. application Ser. No. 16/376,622, filed Apr. 5, 2019 and entitled "Submersible Remote Operated Vehicle Tool Interchange," shows an example tool interchange 20 that can be used herein.

As discussed in more detail below, the operator can operate the manipulator arm 16 to dock into a tool holder of a tool storage unit 32. The operator can then actuate the tool interchange 20 to release the tool from the manipulator arm 16, withdraw the manipulator arm 16 from the tool holder of the tool storage unit 32 and leave the tool 18 in the tool storage unit—in other words, stow the tool 18. The operator can then operate the manipulator arm 16 to dock in a different tool holder storing a different tool 18, and actuate the tool interchange 20 to lock to and establish data and power communications with the different tool 18—in other words, connect to a tool 18. Thereafter, the operator can withdraw the manipulator arm 16 from the tool holder and use the different tool 18 in performing operations. The tool storage unit 32 may be on the ROV 10, on the TMS 24, in both locations and/or elsewhere. The tool storage unit 32 may be a fixed tool storage unit (i.e., with one or more tool holders fixed in position) or a changeable type (i.e., with multiple tool holders, each moveable to be selectively presented for connecting to or stowing a tool). In certain instances of the tool storage unit 32 being a changeable type, the operator can use the control interface 12 to select a particular tool or tool holder from a menu, and the tool storage unit 32 will operate to move the tool holders to present the tool holder to allow the manipulator arm 16 to connect to or stow a tool. In certain instances, the tool storage unit 32 is a carousel type, where the tool holders are arranged on a disk that rotates on its central axis to selectively align the tool holders to be presented.

Figure 2:
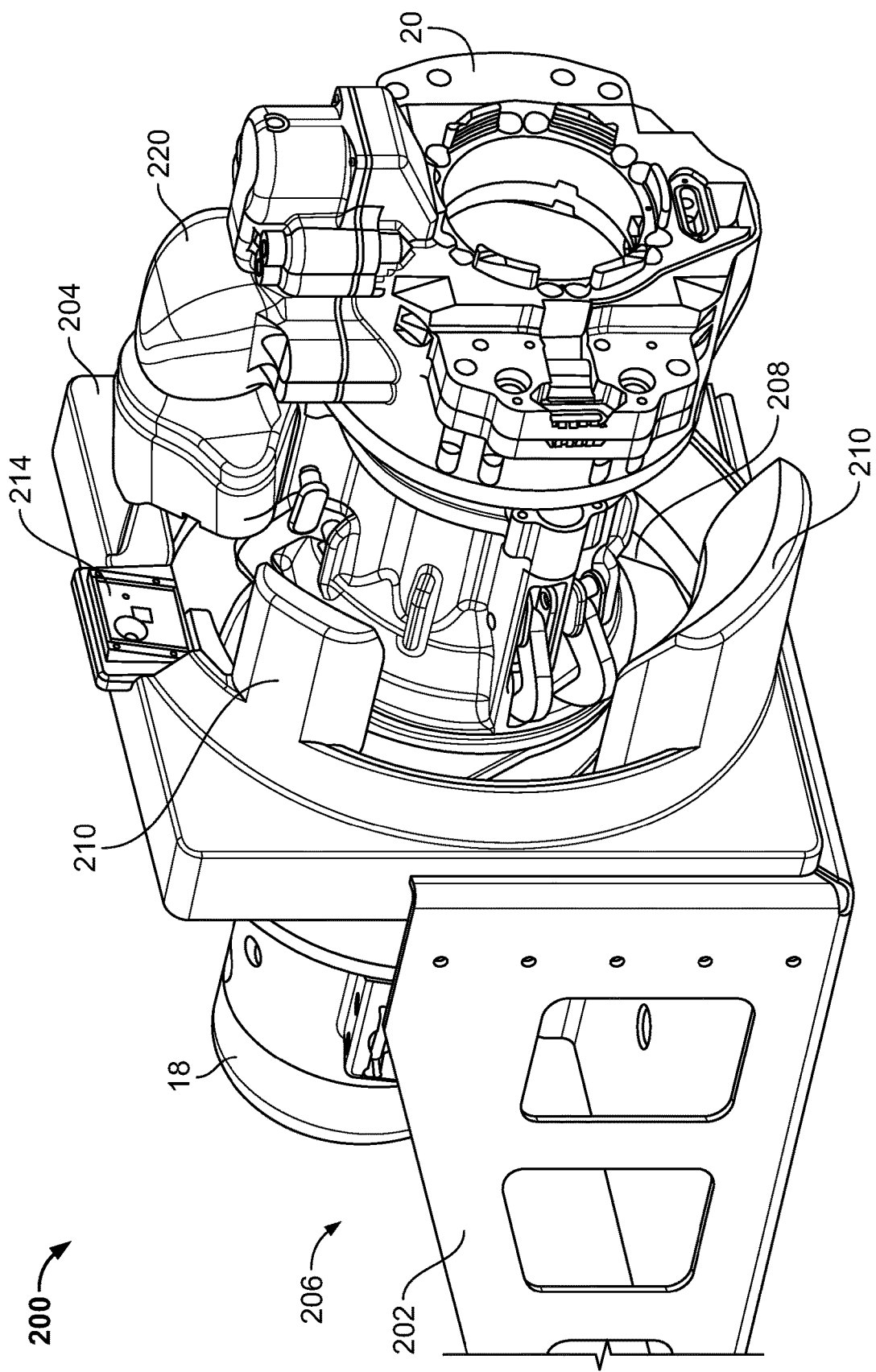
FIG. 2 is a perspective view of an example tool holder with a portion of a docked manipulator arm.

FIG. 2 is a perspective view of an example tool holder 200 that can be used in the tool storage unit 32 described above. The example tool holder 200 is shown with a docked manipulator arm, and more specifically, shown receiving a tool 18 locked to a tool interchange 20. The remainder of the manipulator arm 16 has been omitted for clarity of illustration, but would extend outward from the back of the tool interchange 20 (similar to that shown in FIG. 1). The tool holder 200 includes a housing 202, shown here as a frame, with a face plate 204. The housing 202 defines a receptacle 206 that receives and holds the tool 18, so that the tool can be stored when not in use.

Figure 3A:
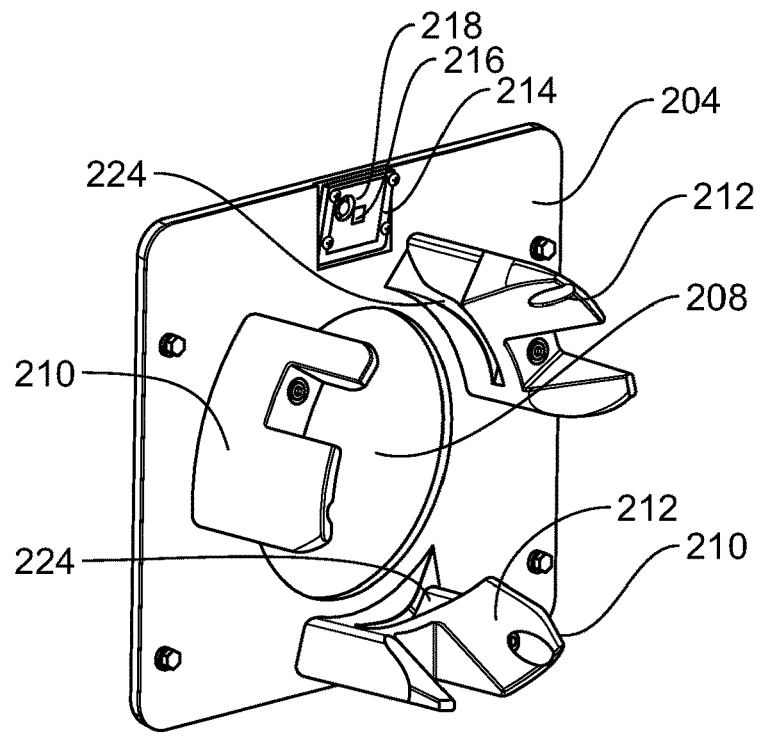
FIG. 3A is a perspective view of a face plate of the tool holder of FIG. 2
Figure 3B:
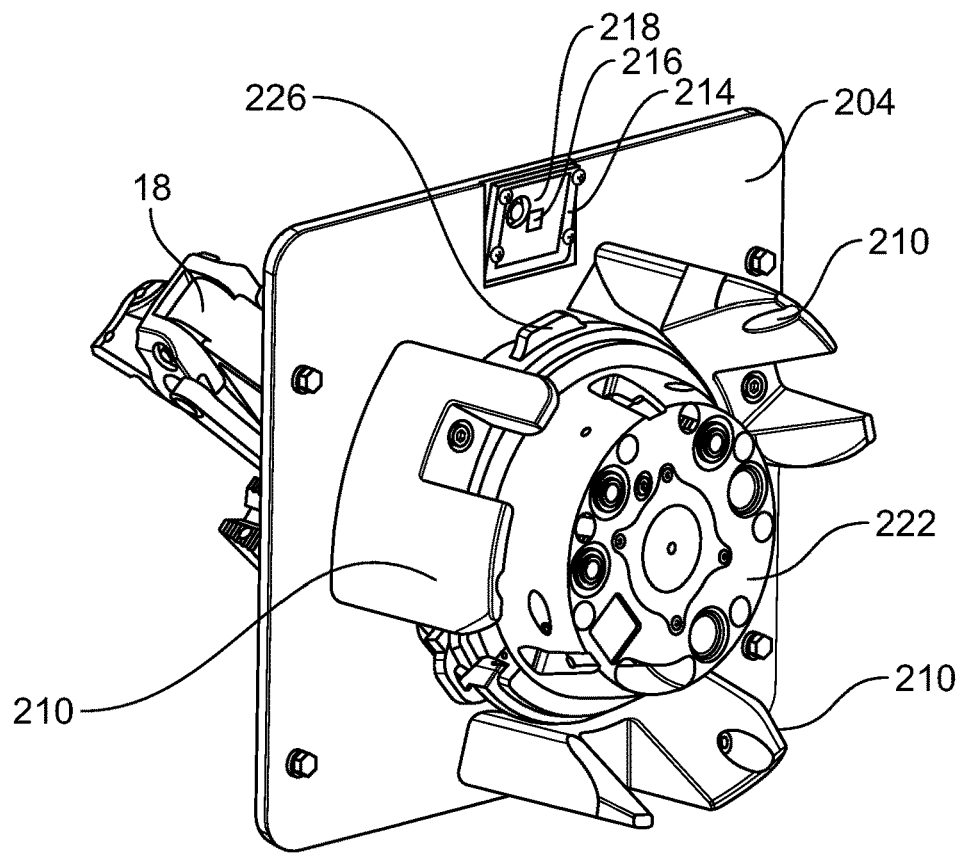
FIG. 3B is a perspective view of the face plate with a male mount of a tool protruding through the faceplate.

The face plate 204, better shown in the perspective view of FIGS. 3A and 3B, has an opening 208 sized to pass the tool 18. A plurality of lead-in ramps 210 are positioned surrounding the opening 208. In FIG. 3A, three lead-in ramps 210 are shown, equally distributed around the opening 208, but fewer or additional lead-in ramps 210 could be provided. Also, FIG. 2 shows the lead-in ramps 210 formed on a common ring affixed to the front surface of the face plate 204, while FIG. 3A shows discrete lead-in ramps 210, separately affixed to the front surface of the plate 204. The lead-in ramps 210 each have a ramped inward facing surface 212, and the surfaces 212 of the lead-in ramps 210 cooperate with one another to define a generally conical guide, decreasing in diameter toward the opening 208. Accordingly, the lead-in ramps 210 are able to contact the outer periphery of a tool 18 received at the mouth of the lead-in ramps 210 and guide the tool 18 in position and orientation toward and through the opening 208 and into the receptacle 206 as the tool 18 is moved toward and into the receptacle 206. The face plate 204 also includes features to lock the tool in place. In certain instances, the features can be provided on the lead-in ramps 210 (or the ring at the base of the lead-in ramps 210 as in FIG. 2) in the form of a twist-lock keyway 224 that engages corresponding key 226 on the periphery of the tool 18. When the keys 226 of the tool 18 are received in the keyways 224, and the tool 18 rotated (clockwise in FIG. 3B), the keys 226 lock into the keyways 224, eventually bottom out at the end of the keyways 224, and signal to the ROV or operator that the tool 18 is fully received, locked and rotationally aligned in the tool holder 200. The key/keyways also axially align and support the tool 18 in the tool holder 200. In certain instances, the key/keyways can be reversed, having keys carried on the face plate 204 and a keyway on the tool 18.

The face plate 204 also has a visual tag 214 that includes an alignment fiducial 216 and a tool location identification marking 218. In certain instances, the alignment fiducial 216 can be embedded within the tool location marking 218 as shown, or it can be separate from the tool location identification marking 218. The alignment fiducial 216 is in a specified position and orientation relative to the opening 208 and receptacle 206 of the tool holder 200, so that it can be used (as discussed below) in guiding the manipulator arm to dock. In certain instances, the alignment fiducial 216 is of a type for 2D position location. In certain instances, the tool location marking 218 can include a human readable marking identifying the tool 18 specified to be stored in the associated receptacle 206 and/or a machine readable marking, like a barcode, quick response "QR" code, or another type of machine readable marking, identifying the tool location.

A camera 220 is carried on the manipulator arm, shown in FIG. 2 as being mounted directly to the tool interchange 20 (that, in turn, is mounted directly to the manipulator arm). In other instances, the camera 220 could be mounted directly to the arm itself or to another component carried by the arm to enable the camera 220 clear sight of the visual tag 214 as the tool 18 is being docked. In certain instances, the camera 220 can be carried by the tool storage unit or something else (e.g., the TMS or other device carrying the tool storage unit). For example, in instances where the tool storage unit is remote from the ROV, the camera 220 might be mounted remote from the ROV.

FIG. 3B shows the tool 18 as it would be positioned when stowed in the tool holder 200, but with the remainder of the tool holder 200 omitted for clarity of illustration. When stowed, a male mount 222 of the tool 18 protrudes through the opening 208 of the face plate 204. The male mount 222 is received in a corresponding receptacle of the tool interchange 20 on the manipulator arm 16, and the tool interchange 20 grips the male mount 222 to lock the tool 18 to the manipulator arm 16. In certain instances, the male mount 222 includes alignment features to center the tool interchange 20 to the tool 18 and rotationally align the tool interchange 20 to the tool 18. For example, in certain instances, the male mount 222 is generally frusta-conical which centers in a corresponding frusta-conical shape of the tool interchange 20 to center the tool 18 to the tool interchange 20, and position the tool 18 in a specified location relative to the manipulator arm 16. Rotational alignment, for example, can be achieved by a key and keyway on the male mount 222 and tool interchange, in certain instances.

Figure 4:
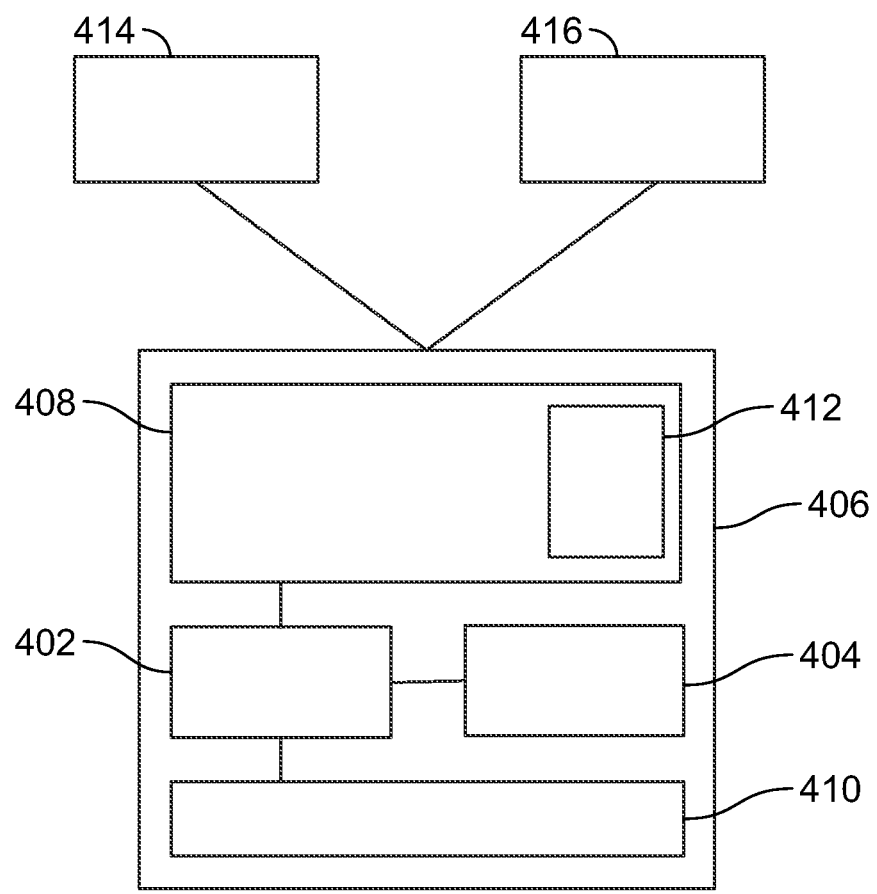
FIG. 4 is a schematic of an aspect of the system described herein, including a control interface, sensors and actuators.

The concepts herein encompass a system for control of the TMS 24 and ROV 10 (including the manipulator arm 16 and tool 18) by computer, having a processor 402 with memory 404, that receives input from sensors 414 of the TMS and/or the ROV and signals actuators 416 that operate the TMS 24 and/or the ROV 10. In particular, the memory 404 stores instructions that cause the processor 402 to perform the operations described herein. The actuators 416 include actuators at each of the joints (e.g., joints 22, FIG. 1) that move the joints in moving the manipulator arm, as well as other actuators. The sensors 414 include one or more position sensors, force sensors (linear and/or torque), the camera (e.g., camera 220), as well as other sensors. In certain instances, the sensors include a sensor in the manipulator arm, near the tool interface, capable of sensing force and/or torques in 6 degrees of freedom. In certain instances, the sensors include a force (liner and/or torque), pressure and/or position sensor at each of the joints (e.g., joints 22) of the manipulator arm. The processor 402 could be a single processor or multiple processors in communication with each other, and the memory 404 could be a single memory or multiple memories in communication with each other. FIG. 4 schematically shows an example of the control interface 12, and for convenience of reference, processor 402 and memory 404 are depicted within a housing 406 of the interface 12. Although shown as all within the housing 406, processor 402 could be distributed, with aspects remote from the housing 406. In certain instances, all or some of the memory 404 could be embedded in a processor. Likewise, although the memory 404 is depicted as one memory, it could be multiple memories all within the housing 406 or with one or more of the memories distributed, remote from the housing 406. In certain instances, the processor 402 is a system of processors distributed in the manipulator arm, ROV and/or housing 406 each with associated (embedded or separate) memory. The processor 402 and memory 404 are in communication with the sensors of the system.

The control interface 12 includes a display 408 and a user input 410 through which the human operator interfaces with the control interface 12. The display 408 can include one or multiple screens, goggles and/or other types of displays. The user input 410 can include one or multiple types of user input, such as keyboards, hand controllers, physical buttons and switches and/or other types of user inputs. The control interface 12 can present the human operator with information about the operation of the ROV, TMS and the environment, as well as menus of options for controlling the system, such as soft menus 412 as depicted in FIG. 4 displayed via the display 408.

In operation, the human operator commands operation of the ROV 10, including the manipulator arm 16 and any connected tool 18, and the TMS 24 via the control interface 12. Beyond controlling the ROV 10 to fly around and controlling the manipulator arm 16 and tool 18 in performing operations, the operator can effectuate docking the arm 16 to a tool holder, such as tool holder 200 (FIG. 2), of a tool storage unit 32. The system described herein automates the docking, which can be activated via the control interface 12 (e.g., via a menu 412, the input 410 and/or other manner).

Figure 5:
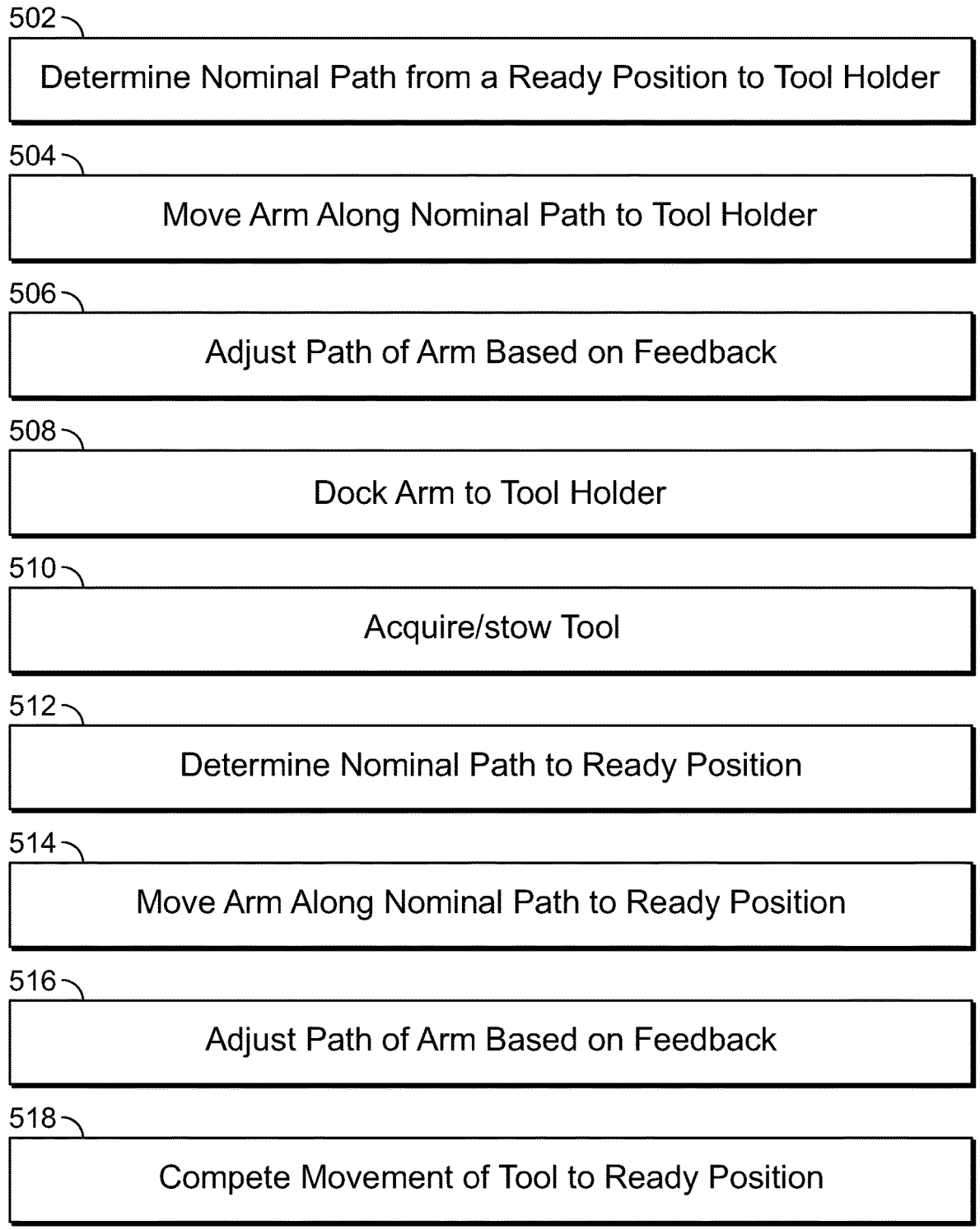
FIG. 5 is a flow diagram of steps in operation of automated docking of the manipulator arm to a tool holder.

FIG. 5 is a flow chart of example method steps in automated docking of the manipulator arm (with or without an attached tool) to a tool holder. In certain instances, before the automation begins, the operator operates the arm to an initial or ready position in proximity to the tool holder. For example, when the tool holder is apart from the ROV, the operator flys the ROV to the tool holder and operates the arm to a position near the tool holder. When the tool holder is on the ROV, the operator positions the arm so it is free of external obstructions and able to move to the tool holder. In response to a command to activate the automated docking, the automated docking sequence is initiated, at operation 502, by determining a nominal path between the current or ready position and orientation of the arm and a docked position and orientation with the arm docked to the tool holder. Throughout operation of the arm, both before and after activation of the automated docking, the system receives and logs input from sensors in the arm and thus knows the current position and orientation of the tool, the joints, and the arm, overall, in 6 degrees of freedom. When the tool storage unit is carried on the ROV, the system likewise knows the position and orientation of the tool holder in 6 degrees of freedom and can, in turn, automatically (i.e., without human assistance) calculate the nominal path of the arm to dock to the tool holder. In calculating the nominal path, the system operates a kinematic model of the manipulator arm and uses this model to calculate the movement of the joints necessary to move the tool into proximity of the opening in the tool holder and to dock with the tool holder, i.e., position and orient the arm so the arm can be connected to a tool protruding from the opening or a tool on the arm inserted into the receptacle of the tool holder. When the tool storage unit is carried apart from the ROV, such as on the TMS, the operator flies the ROV to the tool holder and operates the arm into proximity to the tool holder so the camera can see the tool holder. Once the camera is able to see the tool holder, and the system recognizes the position and orientation of the tool holder, the system can automatically calculate and adjusts the nominal path of the manipulator arm from its current position and orientation to the position and orientation corresponding to the arm docked with the tool holder. In certain instances, the system identifies the alignment fiducial on the tool holder and uses the alignment fiducial in recognizing the tool holder position and orientation.

At operation 504, the system implements movement of the manipulator arm along the nominal path by signaling the actuators at the joints of the manipulator arm to move according to the determined nominal path. In certain instances, the movement can be fully automatic, with no input from the human operator. In other instances, the movement can be controlled to some degree by the human operator. For example, in certain instances, the human operator, using the control interface, can control the speed and start/stop the movement of the arm while the arm is automatically guided along the nominal path.

At operation 506, the system can implement one or more control loops taking feedback from sensors in iteratively controlling the path of the arm (with or without tool) from the nominal path to account for discrepancies between the nominal path and the actual path needed to dock the arm to the tool holder (operation 508). In certain instances, operation 506 can be implemented using images (still or video) from the camera, and in certain instances other sensors (e.g. position sensors at the joints and/or other sensors), as feedback to iteratively make corrections to the manipulator arm path. This control loop is discussed in more detail with respect to FIG. 6. In certain instances, operation 506 can be implemented using output from the one or more force sensors of the manipulator arm that register forces exerted by the arm on the environment, and in certain instances other sensors (e.g., position sensors at the joints and/or other sensors), as feedback to iteratively make corrections to the manipulator arm path. This force accommodation control loop is discussed in more detail with respect to FIG. 7. In certain instances, both the image feedback and force accommodation can be used in nested control loops and/or the control corrections of each relatively weighted (e.g., with the image feedback having greater or lesser influence on the determined corrections than the force sensor feedback) in iteratively correcting the manipulator arm path.

Figure 6:
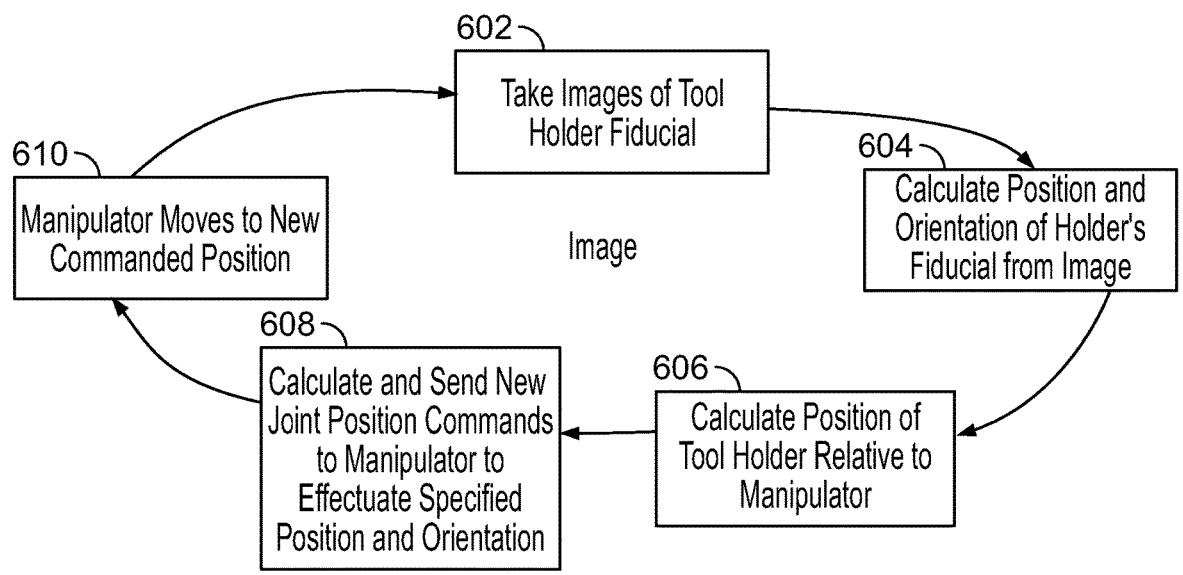
FIG. 6 is a flow diagram of steps in operation of an image feedback control of the system.

Referring to FIG. 6, in operation of the image feedback loop, the camera takes an image of the tool holder at operation 602. At operation 604, the image is analyzed to identify the position and orientation of the tool holder. In certain instances, the image is analyzed to identify the position and orientation of the tool holder using alignment fiducial. Thereafter, a pose estimation calculation is performed. The image of the tool holder, and in certain instances the alignment fiducial, is compared to a specified location relative to the camera to calculate the position and orientation of the tool holder to the camera. At operation 606, the system, in turn, determines the position and orientation of the tool holder relative to the manipulator arm, based on a specified relationship between characteristics in tool holder image, e.g., the alignment fiducial and/or other characteristics, and a specified relationship between the camera and the manipulator arm. At operation 608, the system calculates whether the manipulator arm is positioned and oriented to successfully dock based on the current path. If not, it calculates corrections from the current path to a new specified path that (at least based on the current data) positions and orients the arm to successfully dock to the tool holder, and sends new signals to the actuators at the joints to effectuate the new specified positions and orientations. In certain instances, the system can additionally or alternately operate other aspects of the ROV, such as the thrusters used to navigate the ROV in the water, to adjust the position and orientation of the arm to successfully dock to the tool holder.

Operating the thrusters to reposition the ROV, for example, may be helpful in instances where the tool storage unit is separate from the ROV (e.g., on the TMS or elsewhere). Finally, at operation 610, the manipulator arm moves to the new specified positions and orientations. The feedback loop begins again at operation 602 and repeats, updating the manipulator path position and orientation, until the manipulator arm is successfully docked on the tool holder (e.g., as shown in FIG. 2).

Figure 7:
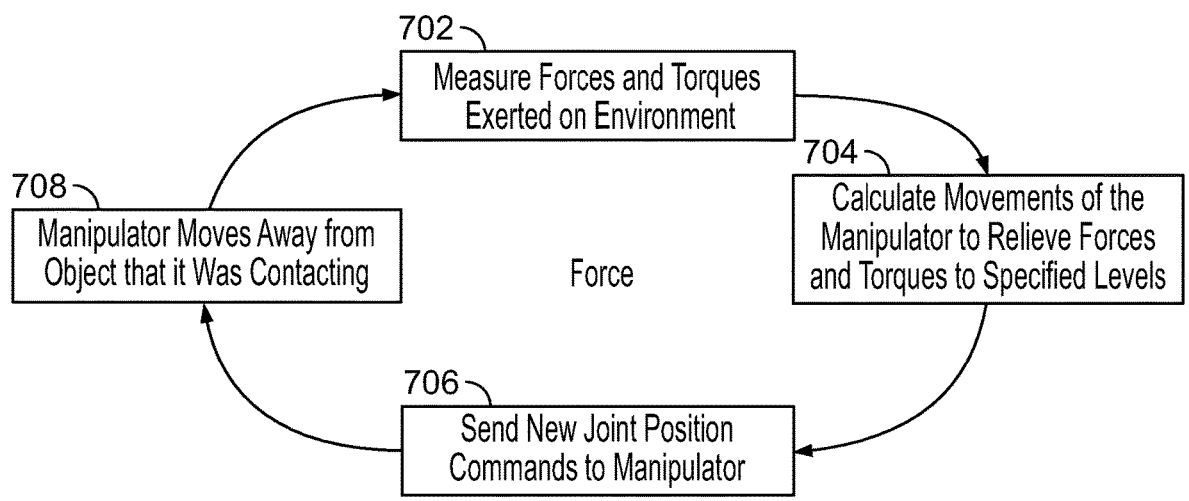
FIG. 7 is a flow diagram of steps in operation of a force accommodation control of the system.

Referring to FIG. 7, in operation of the force accommodation loop, the one or more force sensors measure forces (linear and/or torque) exerted by the manipulator arm on the environment at operation 702. For example, when the manipulator arm or tool contacts one or more of the lead-in ramps of the tool holder, the force sensors measure the resultant forces in the 6 degrees of freedom.

Based on this sensor input, the system determines whether the force in any of the 6 degrees exceeds a specified threshold. If it is determined that the measured force in any of the 6 degrees exceeds the corresponding specified threshold, at operation 704, the system calculates movements of the manipulator arm (in 6 degrees of freedom) to reduce the force below the exceeded specified threshold or thresholds and signals the actuators at the joints to effectuate the movement. In certain instances, there can be different specified thresholds for some or all of the 6 degrees of freedom. For example, as the manipulator arm is extended forward, toward the tool holder and tool holder receptacle, the ramped surfaces of the lead-in ramps drive the arm laterally to orient and center the arm on the opening in the tool holder and the tool receptacle. Thus, by having a lower specified threshold in the degree or degrees of movement that correspond to these imposed lateral forces than the specified threshold in the degree of movement corresponding to the forward extension direction, the system accommodates the mechanical alignment imposed by the lead-in ramps. In certain instances, if the forward extension corresponds to the Y-axis, the specified threshold for Y-axis is greater than the specified threshold for the X-axis, Z-axis, pitch and yaw. In certain instances, the force accommodation can be implemented as a stiffness control, an impedance control, an admittance control or another type of control. For example, in certain instances the force control can be a hybrid position/force control that prioritizes force control for specified degrees of freedom over position control for those degrees of freedom and vice versa. Moreover, the position control, including control to a nominal path and/or image feedback discussed above, can be operated as either an inner control loop to the force accommodation control loop or operated as an outer control loop to the force accommodation control loop, where the inner control loop would have a faster loop rate and have priority over the outer control loop. For example, in certain instances, an admittance control force accommodation loop has position feedback loop as an inner loop. In another example, in certain instances, an impedance control force accommodation is the inner loop with position feedback as the outer loop.

At operation 708, the manipulator arm moves per the movements signaled in operation 706. The feedback loop begins again at operation 702 and repeats, updating the manipulator path position and orientation, until the manipulator arm is successfully docked on the tool holder (e.g., as shown in FIG. 2).

Referring back to FIG. 5, once the manipulator arm is docked, at operation 510, in certain instances, if the manipulator arm is without a tool, the tool interface can be manually (e.g., by the human operator) or automatically actuated to connect to a tool in the tool holder. In certain instances, if the manipulator arm is connected to a tool, the tool interface can be manually or automatically actuated to release and stow the tool in the tool holder.

Thereafter, the manipulator arm can be withdrawn and moved back to the (same or different) ready position, for example, by automatically determining a nominal path to the ready position at operation 512. At operation 514, the system implements movement of the manipulator arm along the nominal path by signaling the actuators at the joints of the manipulator arm to move according to the determined nominal path. As discussed above, in certain instances, the movement can be fully automatic, with no input from the human operator. In other instances, the movement can be controlled to some degree by the human operator. At operation 516, as discussed above (operation 506), the system can implement one or more control loops taking feedback from sensors in iteratively controlling the path of the arm (with or without tool) from the nominal path to account for discrepancies between the nominal path and the actual path needed to position the arm in the ready position. Finally, the process is complete at operation 518, when the arm has been moved to the ready position.

The process of FIG. 5 can be performed again to dock to a different tool holder and acquire/stow a different tool.

In certain instance, automating docking of the manipulator arm to the tool holder can speed up the process of changing or stowing tools. For example, wholly manually controlling the manipulator arm to dock to the tool holder is a difficult process, requiring a high level of operator skill and takes even a highly skilled ROV operator tens of minutes to complete. In certain instances, automated docking can be completed within a minute or a few minutes. The time saved translates directly to costs saved as, not only is the ROV's work performed more quickly, but other work need not wait as long on the ROV's work. Automated docking of the arm to the tool in the holder can also reduce the required operator skill level.

While a number of implementations have been described, it should be appreciated that the concepts herein are not limited to those implementations. Rather, other changes, substitutions, and alterations are also possible without departing from this disclosure.

We claim:

1. A submersible remote operated vehicle (ROV) system, comprising:
   a submersible ROV with a manipulator arm for carrying a tool;
   a tool holder for storing the tool;
   a tool carousel for moving the tool holder; and
   a control system configured to:
   receive an input from a human operator identifying a tool;
   receive data from sensors of the ROV about the operation of the arm;
   operate the tool carousel in response to the input to present the tool holder containing the tool to an access position; and
   automatically control, based on the data, movement of the arm in docking the arm to the tool holder.

2. The submersible ROV system of claim 1, wherein the tool holder is carried by the ROV.

3. The submersible ROV system of claim 1, wherein the sensors comprise a camera, and the control system is configured to receive image data from the camera.

4. The submersible ROV system of claim 1, wherein:
the sensors comprise a force sensor configured to sense forces exerted by the manipulator arm, and the control system is configured to receive force data from the sensor.

5. The submersible ROV system of claim 1, wherein the tool holder comprises:
an opening through which the tool is pass when docking the arm to the tool holder; and
a conical guide, surrounding the opening and decreasing in diameter toward the opening.

6. The submersible ROV system of claim 5, wherein the conical guide comprises a plurality of lead-in ramps, each having a ramped inward facing surface.

7. The submersible ROV system of claim 1, further comprising a key on the tool holder or a keyway defined by the tool holder, the key or the keyway configured to interface with a corresponding keyway defined by the tool or a corresponding key on the tool and lock the tool to the tool holder.

8. A system comprising a processor and memory with instruction stored on the memory operable to cause the system to perform operations comprising:
receive data from a force sensor of an arm a submersible remote operated vehicle (ROV);
automatically determine a nominal path to a target; and
automatically control, based on the data, movement of the arm in docking the arm to the target based on a first force threshold and the nominal path.

9. The system of claim 8, wherein:
the force sensor comprises a torque sensor; and
automatically controlling movement of the arm comprises automatically controlling movement of the arm based on a torque threshold and the nominal path.

10. The system of claim 8, where automatically controlling movement of the arm further comprises automatically controlling movement of the arm based on a second, different force threshold in a different direction than the first force threshold.

11. The system of claim 10, where the first force threshold is in an extension direction of the arm and the second force threshold is lateral to the extension direction, and where the first force threshold is greater than the second force threshold.

12. The system of claim 8, wherein:
receiving data comprises receiving data from a camera, the data comprising an image of the target; and
automatically controlling movement of the arm further comprises automatically controlling the movement of the arm based on the image to align the arm relative to the target.

13. The system of claim 8, comprising repeatedly receiving arm movement input from a human operator during the automatically controlling.

14. A submersible remote operated vehicle (ROV) system, comprising:
a submersible ROV with a manipulator arm for carrying a tool;
a tool holder for storing the tool; and
a control system configured to:
receive data from a force sensor of an arm a submersible remote operated vehicle (ROV);
automatically determine a nominal path to a target; and
automatically control, based on the data, movement of the arm in docking the arm to the target based on a force threshold and the nominal path.

15. The submersible ROV system of claim 14, wherein the tool holder is carried by the ROV.

16. The submersible ROV system of claim 14, wherein the control system is configured to receive image data from a camera, and determine the nominal path based at least partly on the received image data.

17. The submersible ROV system of claim 14, wherein:
the force sensor is configured to sense forces exerted by the manipulator arm; and
the control system is configured to receive force data from the force sensor.

18. The submersible ROV system of claim 14, wherein the tool holder comprises:
an opening through which the tool is pass when docking the arm to the tool holder; and
a conical guide, surrounding the opening and decreasing in diameter toward the opening.

19. The submersible ROV system of claim 18, wherein the conical guide comprises a plurality of lead-in ramps, each having a ramped inward facing surface.

20. The submersible ROV system of claim 14, comprising a key on the tool holder or a keyway defined by the tool holder, the key or the keyway configured to interface with a corresponding key on the tool or a corresponding keyway defined by the tool and lock the tool to the tool holder.

* * * * *